(12) United States Patent
Amon et al.

(10) Patent No.: US 7,700,189 B2
(45) Date of Patent: Apr. 20, 2010

(54) HEAT SHRINKABLE FILM WITH (METH)ACRYLATE RESIN CURABLE ADHESIVE

(75) Inventors: Moris Amon, Beachwood, OH (US); Christopher J. Blackwell, Twinsburg, OH (US); Farid F. Ghiam, Beachwood, OH (US); Patricia Ann Harman, Morgantown, WV (US); Payal Kaul, San Jose, CA (US); Sunder R. Rajan, Mentor, OH (US); Richard K. Williams, Jr., Gibsonia, PA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/686,462

(22) Filed: Mar. 15, 2007

(65) Prior Publication Data
US 2007/0172669 A1   Jul. 26, 2007

Related U.S. Application Data

(63) Continuation of application No. PCT/US2006/034799, filed on Sep. 8, 2006.

(60) Provisional application No. 60/715,689, filed on Sep. 9, 2005.

(51) Int. Cl.
*B32B 7/12*   (2006.01)

(52) U.S. Cl. ............... 428/355 AK; 428/355 AC; 428/355 N (58) Field of Classification Search ............. 428/355 R, 428/355 AK, 355 AC, 355 N
See application file for complete search history.

(56) References Cited

U.S. PATENT DOCUMENTS

| 4,507,458 | A | * | 3/1985 | Shiraki et al. ............ 528/49 |
| 4,643,944 | A | * | 2/1987 | Agethen et al. ............ 428/349 |
| 4,820,745 | A |   | 4/1989 | Muller et al. ............ 522/90 |
| 4,906,727 | A |   | 3/1990 | Fischer et al. ............ 528/230 |
| 5,213,744 | A |   | 5/1993 | Bossaert ............ 264/171 |
| 5,418,016 | A |   | 5/1995 | Cornforth et al. ............ 427/515 |
| 5,629,398 | A |   | 5/1997 | Okamoto et al. ............ 526/281 |
| 5,883,148 | A |   | 3/1999 | Lewandowski et al. ....... 522/95 |
| 5,989,778 | A |   | 11/1999 | Hozumi ............ 430/281.1 |
| 6,017,603 | A |   | 1/2000 | Tokuda et al. ............ 428/64 |

(Continued)

FOREIGN PATENT DOCUMENTS

EP   0 560 211   9/1993

(Continued)

OTHER PUBLICATIONS

XP-002413450; Database WPI Week 200169; Derwent Publications Ltd., 2001-605683; JP 2001-220559; Aug. 14, 2001.

(Continued)

*Primary Examiner*—Thao T. Tran (57) ABSTRACT

A heat shrinkable label comprises (A) a heat shrinkable film comprising at least one thermoplastic polymer, and (B) a curable adhesive comprising (1) at least one urethane (meth) acrylate resin having an average of about 1 to about 1.6 (meth)acrylate groups per resin molecule, (2) at least one tackifier, and (3) at least one photoinitiator, where the film has an ultimate shrinkage at 135° C. of at least 15%, and the adhesive has sufficient precure tack, wherein the loop tack of the uncured adhesive is at least 4.3 g/cm$^2$. The heat shrinkable label is useful in high-speed industrial processes such as beverage container labeling.

23 Claims, 1 Drawing Sheet

U.S. PATENT DOCUMENTS

| | | |
|---|---|---|
| 6,184,326 B1 | 2/2001 | Razavi et al. ............... 526/351 |
| 6,649,259 B1 | 11/2003 | Hu et al. ..................... 428/343 |
| 6,808,822 B2 | 10/2004 | Rajan et al. ................. 428/516 |
| 2004/0010111 A1 | 1/2004 | Birkett et al. ................. 528/44 |

FOREIGN PATENT DOCUMENTS

| | | |
|---|---|---|
| EP | 1 375 617 | 1/2004 |
| EP | 1 375 618 | 1/2004 |
| JP | 2004107490 | 4/2004 |
| WO | 98/58006 | 12/1998 |
| WO | 01/16244 | 3/2001 |
| WO | 04/000961 | 12/2003 |
| WO | 2004/060946 | 7/2004 |
| WO | 2007/030584 | 3/2007 |

OTHER PUBLICATIONS

PCT/US2006/034799; PCT International Search Report mailed Jan. 22, 2007.

PCT/US2006/034800; PCT International Search Report mailed Nov. 24, 2006.

\* cited by examiner

FIG. 1

HEAT SHRINKABLE FILM WITH (METH)ACRYLATE RESIN CURABLE ADHESIVE

RELATED APPLICATIONS

This application is a continuation of International Application No. PCT/US2006/034799, filed Sep. 8, 2006, which claims priority to U.S. Provisional Application No. 60/715,689, filed Sep. 9, 2005. The entire disclosure of this international application and the entire disclosure of this provisional application are hereby incorporated by reference.

FIELD OF THE INVENTION

The present invention relates to the combination of a heat shrinkable film and a curable (meth)acrylate based adhesive which is useful in various industrial applications including the label and tape industry.

BACKGROUND OF THE INVENTION

Heat shrinkable films are useful to encapsulate articles for protective and/or identification purposes. There is a constant need for heat shrinkable films that combine good shrink performance with other physical properties to meet the demands of various applications.

Adhesives are useful for sealing, coating and attaching and thus have a widespread industrial application. Curable adhesives can provide advantages in terms of energy consumption, environmental and occupational safety compliance, and compatibility with high speed industrial processes. Current commercially available energy curable adhesives, for use with heat shrinkable films for wrap-around labeling of articles such as beverage containers, are in general extremely viscous, require a high temperature for application to the film, can cause an undesirable preshrinkage of the film, and generally results in a label having poor appearance.

SUMMARY

The present invention combines a heat shrinkable film and a curable (meth)acrylate based adhesive, wherein the combination is useful for labeling containers especially in a high speed process. The film, in one aspect of the invention, combines high shrinkage with low shrink tension plus a high modulus and a low density. The curable adhesive combines good pre-cure spreadability and tack with good post-cure peel and shear type adhesive strength. In one aspect of the invention, the combination of the film and adhesive provides a heat shrinkable label of superior appearance having customer appeal due to the film and adhesive seam being highly conformable. Furthermore, this heat shrinkable label is compatible in the recycling of dense materials such as poly(ethylene terephthalate) due to the low density of the constituent film. The inventive combination of the film and adhesive is particularly useful in high speed labeling of containers such as bottles using a process of a continuous roll fed film on a wrap-around labeler.

The present invention is directed to a heat shrinkable label which comprises (A) a heat shrinkable film comprising at least one thermoplastic polymer, and (B) a curable adhesive comprising (1) at least one urethane (meth)acrylate resin having an average of about 1 to about 1.6 (meth)acrylate groups per resin molecule, (2) at least one tackifier, and (3) at least one photoinitiator, wherein the film has an ultimate shrinkage at 135° C. of at least 15%, and the adhesive has sufficient precure tack, wherein the loop tack of the uncured adhesive is at least 4.3 g/cm$^2$.

In one embodiment of the invention, a heat shrinkable label comprises (A) a heat shrinkable film comprising (1) a core layer having an upper and lower surface and comprising a blend of (a) at least one low molecular weight resin or rosin having a number average molecular weight below 5,000 and a softening point of 10-180° C. and (b) at least one syndiotactic polypropylene or cyclic olefin copolymer, (2) a first skin layer overlying the upper surface of the core layer, and (3) a second skin layer underlying the lower surface of the core layer, and (B) a curable adhesive comprising (1) at least one urethane (meth)acrylate resin having an average of about 1 to about 1.6 (meth)acrylate groups per resin molecule, (2) at least one tackifier, and (3) at least one photoinitiator where the film is oriented and has an ultimate shrinkage at 135° C. of at least 25%, the adhesive having sufficient precure tack, wherein the loop tack of the uncured adhesive is at least 4.3 g/cm$^2$.

DETAILED DESCRIPTION

The present invention is directed to a heat shrinkable label that comprises (A) a heat shrinkable film comprising at least one thermoplastic polymer, and (B) a curable adhesive comprising (1) at least one urethane (meth)acrylate resin having an average of about 1 to about 1.6 (meth)acrylate groups per resin molecule, (2) at least one tackifier, and (3) at least one photoinitiator where the film has an ultimate shrinkage at 135° C. of at least 15%, and the adhesive has sufficient precure tack, wherein the loop tack of the uncured adhesive is at least 4.3 g/cm$^2$ as described hereinbelow. The heat shrinkable film (A) can be a monolayer film or a multilayer film. In one embodiment of the invention, the heat shrinkable film is a multilayer film comprising a core layer and at least one skin layer as described hereinbelow. The heat shrinkable film of this invention can be stretched or oriented in a machine direction, in a transverse direction, or in both directions, wherein the machine direction is the direction that the film is advanced during film manufacture and the transverse direction is normal or perpendicular to the machine direction. In several embodiments of the invention, the heat shrinkable film is uniaxially oriented in a machine direction or biaxially oriented in a machine direction and a transverse direction.

In one embodiment, a heat shrinkable label comprises (A) a heat shrinkable film comprising (1) a core layer having an upper and lower surface and comprising a blend of (a) at least one low molecular weight resin or rosin having a number average molecular weight below 5,000 and a softening point of 10-180° C. and (b) at least one syndiotactic polypropylene or cyclic olefin copolymer, (2) a first skin layer overlying the upper surface of the core layer, and (3) a second skin layer underlying the lower surface of the core layer, and (B) a curable adhesive comprising (1) at least one urethane (meth) acrylate resin having an average of about 1 to about 1.6 (meth)acrylate groups per resin molecule, (2) at least one tackifier, and (3) at least one photoinitiator, wherein the film is oriented and has an ultimate shrinkage at 135° C. of at least 25%, and the adhesive has sufficient precure tack, wherein the loop tack of the uncured adhesive is at least 4.3 g/cm$^2$ as described hereinbelow. As used herein, the terms "overlying"

and "underlying" mean that a first layer such as a skin layer can be in direct contact with second layer such as a core layer or that one or more intermediate layers such as one or more tie layers can be between the first and second layers.

In an embodiment of the invention, the heat shrinkable film is a monolayer film having an upper surface and a lower surface and the curable adhesive (B) is partially or fully applied to a leading edge and a trailing edge of the upper surface or the lower surface of the film which is suitable for a wrap around labeling process. In another embodiment, the heat shrinkable film is a multilayer film comprising a core layer having an upper and lower surface, a first skin layer overlying the upper surface of the core layer, and a second skin layer underlying the lower surface of the core layer, wherein the adhesive is partially or fully applied to a leading edge and a trailing edge of the first skin layer or the second skin layer. Application of the adhesive to the first or second skin layer generally depends on the composition of each skin layer and its intended use for printing, for adhesion, or both printing and adhesion.

In several embodiments of the invention, the heat shrinkable film is a multilayer film having two skin layers wherein the two skin layers have the same composition or have different compositions.

Film Thermoplastic Polymer

The heat shrinkable film of the invention comprises at least one thermoplastic polymer. The thermoplastic polymer comprises polyolefins such as, for example, polypropylenes and polyethylenes, low molecular weight resins or rosins such as, for example, polyterpenes, alkene-unsaturated carboxylic acid or carboxylic acid derivative copolymers such as, for example, ethylene-acrylic acid copolymers and ethylene-vinyl acetate copolymers and ionomers such as sodium and zinc salts of ethylene-methacrylic acid copolymers, styrene polymers and copolymers such as, for example, polystyrenes and styrene-acrylonitrile copolymers, poly(vinyl chloride)s, polycarbonates, polyamides, fluoropolymers, poly(vinyl alcohol)s and alkene-vinyl alcohol copolymers, polyesters such as, for example, poly(ethylene terephthalate)s, cellulosics, polysulfones, polyurethanes, polyacrylonitriles, unsaturated carboxylic acid ester polymers such as, for example, polyacrylates, and mixtures of any of the foregoing thermoplastic polymers.

Film Core Layer

The heat shrinkable film of this invention can be a multilayer film comprising a core layer and at least one skin layer. In one embodiment of the invention, the core layer comprises at least one thermoplastic polymer. In another embodiment, the core layer comprises at least one polyolefin. Polyolefins comprise homopolymers or copolymers of olefins which are aliphatic hydrocarbons having one or more carbon to carbon double bonds. Olefins include alkenes which comprise 1-alkenes, also known as alpha-olefins, such as, for example, 1-butene and internal alkenes having the carbon to carbon double bond on nonterminal carbon atoms of the carbon chain such as, for example, 2-butene, cyclic olefins having one or more carbon to carbon double bonds such as, for example, cyclohexene and norbornadiene, and noncyclic polyenes which are noncyclic aliphatic hydrocarbons having two or more carbon to carbon double bonds such as, for example, 1,4-butadiene and isoprene. Polyolefins comprise alkene homopolymers from a single alkene monomer such as, for example, a polypropylene homopolymer, alkene copolymers from at least one alkene monomer and one or more additional olefin monomers where the first listed alkene is the major constituent of the copolymer such as, for example, a propylene-ethylene copolymer and a propylene-ethylene-butadiene copolymer, cyclic olefin homopolymers from a single cyclic olefin monomer, and cyclic olefin copolymers from at least one cyclic olefin monomer and one or more additional olefin monomers wherein the first listed cyclic olefin is the major constituent of the copolymer, and mixtures of any of the foregoing olefin polymers. In one embodiment, the core layer comprises a polyolefin copolymer comprising an alkene copolymer such as, for example, a propylene-alpha-olefin copolymer. In another embodiment, the core layer comprises a blend of polyolefins comprising a propylene-alpha-olefin copolymer and a polypropylene or polybutylene homopolymer.

In yet another embodiment of the invention, the core layer comprises a blend of (a) at least one low molecular weight resin or rosin having a number average molecular weight below 5,000 and a softening point of 10-180° C. and (b) at least one syndiotactic polypropylene or cyclic olefin copolymer.

Low Molecular Weight Resin or Rosin

The low molecular weight resin or rosin can have a number average molecular weight below 5,000, or below 3,000, or below 1,000 and, as measured by ASTM procedure D36, a Ring and Ball softening point ranging from 10-180° C., or 50-180° C., or 60-160° C., or 130-150° C. The low molecular weight resin or rosin can be natural, synthetic, or a mixture thereof. Natural and/or synthetic resins or rosins comprise hydrocarbon resins derived from petroleum or coal tar or plants, rosins derived from plants and comprising $C_{20}$ resin carboxylic acids, modified plant rosins, and mixtures of any of the foregoing resins or rosins. The modified plant rosins comprise hydrogenated rosins, dehydrogenated rosins, disproportionated rosins, rosin esters of polyhydric alcohols, and mixtures of any of the foregoing modified rosins. The hydrocarbon resins comprise aliphatic resins, aromatic resins, and mixtures thereof. Aromatic hydrocarbon resins can be prepared by polymerization of an aromatic monomer or copolymerization of an aromatic monomer with at least one other aromatic monomer or olefin. Aromatic hydrocarbon resins include polystyrene resins, styrene copolymer resins, polyindene resins, and indene-coumarone resins. The aliphatic hydrocarbon resins can be prepared by polymerization or copolymerization of olefins (aliphatic hydrocarbons having one or more carbon to carbon double bonds) and can be unsaturated, saturated via hydrogenation, or a mixture of both. Aliphatic hydrocarbon resins include polyterpenes (polyterpene resins).

In one embodiment, the low molecular weight resin or rosin comprises at least one polyterpene, at least one hydrogenated polyterpene, or mixtures thereof. The polyterpene comprises a homopolymer and/or copolymer of one or more terpene hydrocarbons which are generally derived from plant essential oils. Polyterpene resins are a well-known class of resinous materials obtained by the polymerization or copolymerization of terpene hydrocarbons including acyclic terpenes, monocyclic terpenes, bicyclic terpenes, and mixtures of any of the foregoing terpenes. Terpene hydrocarbons comprise careens, pinenes, dipentene, terpinenes, terpineols, terpinolene, terpentines, terpene distillation cuts or fractions, terpentines, and mixtures of any of the foregoing terpene hydrocarbons. In one embodiment, the polyterpene of the core layer comprises a hydrogenated polyterpene that can also be effective in improving the properties of the films. Hydrogenation of a resin or rosin including a polyterpene can be done using a supported metal catalyst in an inert solvent such as, for example, nickel on kieselguhr in cyclohexane as described in U.S. Pat. No. 5,213,744.

The low molecular weight resin or rosin generally comprises a blend of at least one resin or rosin with a carrier resin such as, for example, a polypropylene or a nucleated polypropylene which can provide improved stiffening action, increased modulus and increased strength of the resulting film, as well as acting as a densifying component that can lower the shrink force or tension of the film. The blend weight ratio of low molecular weight resin or rosin to carrier resin can range respectively from 10-90:10-90, or 20-60:40-80 or 60-90:10-40 as described in U.S. Pat. No. 5,213,744. Useful low molecular weight resins and rosins include hydrogenated polyterpenes including those having a melt index of 8-15 g/10 min. at 190° C. An example of a commercially available hydrogenated polyterpene is Exxelor PA609A from Exxon Mobil which has a melt index of 11 g/10 min. (ASTM D1238) and a density of 0.975 g/cm$^3$ (ASTM D1505). An example of a commercially available polyterpene is Exxelor PA609N from Exxon Mobil which has a melt index of 11 g/10 min and a density of 0.975 g/cm$^3$.

The low molecular weight resin or rosin can be present in the core layer at about 5% to about 60%, or about 10% to about 50% or about 15% to about 40% by weight based on the weight of the core layer.

Syndiotactic Polypropylene

The syndiotactic polypropylene comprises a polypropylene homopolymer which has a majority of the methyl groups attached to the carbon polymer chain alternating regularly from one side to the other side of the polymer chain. Syndiotactic polypropylene is less crystalline than an isotactic polypropylene homopolymer which has the majority of methyl groups on one side of the polymer chain. Syndiotactic polypropylene has a high degree of syndiotacticity with a syndiotactic index value of at least 70%, or 80%, or 90% as measured by NMR (nuclear magnetic resonance) spectroscopy as described in U.S. Pat. No. 6,184,326, which also describes methods to prepare syndiotactic polypropylenes. Useful commercial syndiotactic polypropylene homopolymers include Finaplas® 1471, 1571 and 1251 which are available from Atofina. The syndiotactic polypropylene can be present in the core layer at about 10% to about 95%, or about 20 to about 80%, or about 30 to about 65% by weight based on the weight of the core layer.

Cyclic Olefin Copolymer

The cyclic olefin copolymer comprises copolymers of at least one cyclic olefin monomer and at least one other olefin monomer where the cyclic olefin monomer content in the cyclic olefin copolymer is on a weight basis greater than 50%, or 55% or 60%. The cyclic olefin monomer comprises cyclic olefins having one or more carbon to carbon double bonds and one or more rings such as, for example, cyclohexene, dicyclopentadiene, norbornene and norbornadiene. The other olefin monomer comprises other cyclic olefin monomers, alkenes, noncyclic polyenes, and mixtures of any of the foregoing olefin monomers. In one embodiment, the cyclic olefin copolymer is prepared by polymerizing a cyclic olefin monomer and an alkene having 2 to 22 carbon atoms, and in another embodiment, the cyclic olefin copolymer is prepared by polymerizing a cyclic olefin monomer and an alpha-olefin having 2-22 carbon atoms using a metallocene catalyst. Cyclic olefin copolymers are further disclosed in U.S. Pat. No. 5,629,398. Useful cyclic olefin copolymers include the norbornene-ethylene copolymers Topas® 8007 and 9506 which are available from Ticona and the cyclic olefin copolymers Zeonor® 1020R and 1060R which are available from Zeon Chemicals LP. The cyclic olefin copolymer can be present in the core layer at about 10% to about 95%, or about 20% to about 80%, or about 30% to about 65% by weight based on the weight of the core layer.

Other Polymers

In one embodiment of the invention, the core layer, which comprises at least one low molecular weight resin or rosin and at least one syndiotactic polypropylene or cyclic olefin copolymer, further comprises at least one other thermoplastic polymer as described above. In another embodiment, the core layer further comprises at least one other polyolefin. In a further embodiment, the core layer further comprises at least one alpha-olefin homopolymer or copolymer or a mixture of any of the foregoing polymers. The alpha-olefin generally has 2-20 or 2-12 or 2-8 carbon atoms. In yet another embodiment, the core layer further comprises at least one polypropylene homopolymer or copolymer or a mixture of any of the foregoing polymers. In additional embodiments of the invention, the alpha-olefin homopolymer or copolymer or mixture thereof can be nucleated, and the polypropylene homopolymer or copolymer or mixture thereof can be nucleated. Polypropylene homopolymers and copolymers comprise those having an ASTM D1238 melt index in g/10 minutes of 1-40, or 4-30 or 8-20. The polypropylene copolymers are prepared from propylene and at least one other olefin monomer wherein the olefin monomer comprises $C_2$ and $C_4$-$C_{20}$ alpha-olefins and the propylene monomer content is greater than 50% on a mole or weight basis. Useful polypropylenes include the nucleated isotactic polypropylene homopolymers P4GK-173X from Huntsman and HF12G1 from BP Amoco, and the nucleated polypropylene copolymer P5M4K-070X from Huntsman which is a propylene-ethylene copolymer. In another embodiment, the core layer further comprises a polyethylene homopolymer and/or copolymer which can range from low density of 0.86 g/cm$^3$ to high density of 0.98 g/cm$^3$. The thermoplastic polymer or polyolefin or alpha-olefin homopolymer and/or copolymer can be present in the core layer on a weight basis from about 8% to about 85%, or about 14% to about 60% or about 20% to about 40% based on the weight of the core layer.

In another embodiment, the core layer further comprises at least one polyisobutylene to reduce the shrink tension of the film. The polyisobutylene can have a low or a high viscosity average molecular weight of respectively of 35,000 to 70,000, or 800,000 to 2,500,000. Useful commercial polyisobutylenes include low molecular weight polymers of the VISTANEX™ LM series and high molecular weight polymers of the VISTANEX™ MM series from Exxon Chemical. The polyisobutylene can be present in the core layer on a weight basis from about 0.5% to about 10%, or about 1% to about 7% or about 1% to about 5% based on the weight of the core layer.

Film Skin Layer(s)

The heat shrinkable film can be a multilayer film comprising a core layer and at least one skin layer. In embodiments of the invention, the skin layer or skin layers comprise at least one thermoplastic polymer, at least one polyolefin, at least two polyolefins, or at least two alpha-olefin polymers comprising alpha-olefin homopolymers or alpha-olefin copolymers or mixtures of alpha-olefin homopolymers and copolymers, wherein the thermoplastic and polyolefin and alpha-olefin polymers are described hereinabove. In another embodiment of the invention, at least one skin layer is a printable skin layer and comprises at least one alpha-olefin copolymer. In other embodiments of the invention, the film comprises two skin layers where each of the skin layers independently comprises at least one alpha-olefin copolymer and at least one alpha-olefin homopolymer, at least two alpha-olefin copolymers, or at least two alpha-olefin copolymers and at least one alpha-olefin homopolymer. The alpha-olefin homopolymers and copolymers comprise isotactic polypropylene homopolymers which can be nucleated, polyethylene homopolymers having an ASTM D1238 melt index of 1-40 g/10 minutes, polypropylene copolymers which can be nucleated such as, for example, propylene-ethylene copolymers, and polyethylene copolymers such as, for example, very low density polyethylene copolymers. Useful alpha-olefin polymers include the nucleated isotactic polypropylene homopolymers P4GK-173X from Huntsman and HF12G1 from BP Amoco, polypropylene copolymers such as the nucleated propylene-ethylene copolymer P5M4K-070X from Huntsman, and the very low density polyethylene copolymer Affinity® KC8852 from Dow which is an ethylene-1-octene copolymer prepared by metallocene catalysis. The alpha-olefin copolymers can be present in the skin layers on a weight basis from about 10% to about 100%, or about 20% to about 100%, or about 30% to about 100%. The alpha-olefin homopolymers can be present in the skin layers on a weight basis up to 90%, or 80% or 70%.

Film Tie Layers

The heat shrinkable multilayer film of this invention can comprise at least one tie layer. The multilayer film can have a skin layer or skin layers in direct contact with a core layer or can have a tie layer between a skin layer and a core layer or between each skin layer and a core layer wherein tie layers function to improve adhesion of the film layers. The tie layers comprise any polymer that improves adhesion of a core layer and a skin layer. Examples of suitable tie layers include polyethylene copolymers including ethylene-alpha-olefin copolymers having a high alpha-olefin comonomer content, alkene-unsaturated carboxylic acid or carboxylic acid derivative copolymers such as, for example, ethylene-methacrylic acid copolymers and ethylene-vinyl acetate copolymers and ionomers such as zinc salts of ethylene-methacrylic acid copolymers, unsaturated dicarboxylic acid anhydride grafted polymers and copolymers such as maleic anhydride grafted ethylene-vinyl acetate copolymers and maleic anhydride grafted polyethylenes, styrene-butadiene copolymers, $C_3$ or higher alpha-olefin copolymers having a high alpha-olefin comonomer content such as, for example, a propylene-1-butene copolymer having a 1-butene content up to 14% by weight.

Film Additives

The heat shrinkable film can comprise one or more additives to enhance the manufacture and processing of the film and/or the service performance of the film. The monolayer film or each of the layers of the multilayer film can comprise at least one additive. The additives comprise antiblocking agents, processing aids, nucleating agents, fillers, colorants to include pigments and dyes, antistatic agents, antioxidants, slip agents, ultraviolet stabilizers, and mixtures of any of the foregoing additives. The additives can be introduced to the film or film layers as a component of a film polymer wherein the additive is blended with a film polymer such as, for example, a nucleated polypropylene polymer which is a blend of the polymer and a nucleating agent or as an additive concentrate where the additive concentrate comprises the additive and a carrier resin such as, for example, antiblocking agents and processing aids. The skin and core layers can comprise nucleating agents to enhance film stiffness and clarity. The skin layers can comprise surface active additives to facilitate manufacture and processing to include antiblocking agents, processing agents and antistatic agents. Nucleating agents are generally a component of a film polymer such as a nucleated polypropylene film polymer as described hereinabove. Useful antiblocking agents include the antiblock concentrates Ampacet 401960 (Seablock-4) and ABPP05-SC from A. Schulman. Useful processing aids include the processing aid concentrate Ampacet 401198. Each of the additives can be present in the film or a layer of the film on a weight basis of about 0.005% to about 20%, or about 0.01% to about 15%, or about 0.02% to about 10%.

Film Processing and Construction

The heat shrinkable film can be prepared by means known to those skilled in the art to include extrusion, coextrusion, lamination, coating, and combinations thereof as described in U.S. Pat. No. 6,808,822. In embodiments of the invention, the film is prepared by extrusion or coextrusion. The film of this invention can be nonoriented or oriented. The orientation can be uniaxial or biaxial. The uniaxially oriented film can be oriented in a machine direction or in a transverse direction. The extruded or coextruded film in several embodiments of the invention can be oriented by stretching it in the machine direction in a one stage or 2 stage stretching or drawing process wherein the draw or stretch ratio can be 1.1-9:1, 2-9:1, 3-7:1, 4-6:1, 1.1-3:1, or 1.1-2:1. The draw or stretching temperature can range from 90-140° C., or 100-135° C., or 105-130° C. In one embodiment, the film is oriented in the machine direction at a draw ratio of 4.6-5.4:1 and a draw temperature of 108-118° C. In another embodiment, this orienting is uniaxial in the machine direction only. In one embodiment of the invention, the film is oriented in the machine direction at a draw ratio of 5.5-6.5:1 and a draw temperature of 116-126° C., and in another embodiment this orienting is uniaxial in the machine direction only. In another embodiment of the invention, the stretched film can be annealed wherein the annealing temperature is below the stretching or drawing temperature as disclosed in U.S. Pat. No. 6,808,822.

The prepared film can be further treated on one surface or both the upper and lower surfaces to enhance performance in terms of printability or adhesion to an adhesive. The treatment can comprise applying a surface coating such as, for example, a lacquer, applying a high energy discharge to include a corona discharge to a surface, applying a flame treatment to a surface, or a combination of any of the foregoing treatments. In an embodiment of the invention, a coextruded film is treated on both surfaces, and in another embodiment a coextruded film is treated on one surface with a corona discharge and is flame treated on the other surface.

Figure 1:
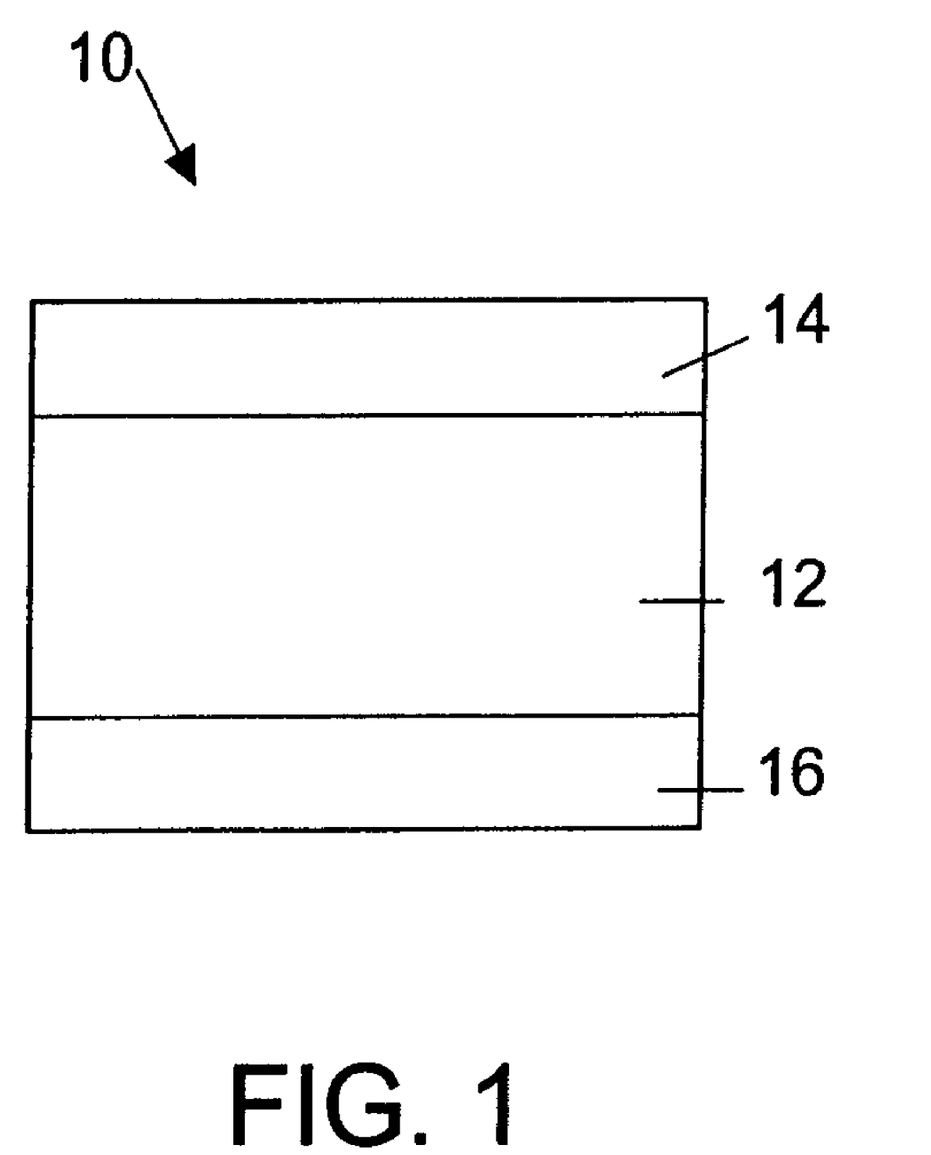
FIG. 1 is a cross-sectional view of a heat shrinkable multilayer film of the invention.

The film can range in thickness from 0.5-20, or 0.5-12, or 0.5-8, or 1-3 mils. The difference in the layers of the film can include a difference in thermoplastic polymer components, in additive components, in orientation, in thickness, or a combination thereof. FIG. 1 depicts a multilayer film 10 of this invention where the film comprises a relatively thick core layer 12 and a relatively thin first skin layer 14 attached to the upper surface of the core layer and a relatively thin second skin layer 16 attached to the lower surface of the core layer. The thickness of the core layer can be 50-95%, or 60-95% or 70-90% of the thickness of the film. The thickness of a skin layer or of a combination of two skin layers can be 5-50%, or 5-40% or 10-30% of the thickness of the film.

The heat shrinkable film upon exposure to elevated temperatures has an ultimate shrinkage as measured by ASTM procedure D1204. In an embodiment of the invention, a heat shrinkable film comprises at least one thermoplastic polymer and has an ultimate shrinkage at 135° C. of at least 15%. In another embodiment, a heat shrinkable multilayer film comprises a core layer comprising a blend of at least one low molecular weight resin or rosin having a number average molecular weight below 5,000 and a softening point of 10-180° C. and at least one syndiotactic polypropylene or cyclic olefin copolymer, wherein the film is oriented and has an ultimate shrinkage at 135° C. of at least 25%. In a further embodiment, this multilayer film is uniaxially oriented in the machine direction only and has an ultimate shrinkage at 135° C. of at least 25% in the machine direction. In another embodiment of the invention, the film is oriented uniaxially in the machine direction only and has a significantly higher tensile strength as measured by ASTM procedure D882 in the machine direction compared to the transverse direction. In another embodiment, the ratio of tensile strength in the transverse direction to tensile strength in the machine direction is 0.75 or less, 0.7 or less, or 0.65 or less.

FILM EXAMPLES

The following nonlimiting examples further describe and illustrate the heat shrinkable film of this invention.

Example 1

A 50.8 micrometer (2 mil) thick film, having a core layer[a] and an upper and lower skin layer[b], is prepared by coextrusion through a linear die. The film is machine direction oriented at a draw ratio of 5:1 and a draw temperature of 113° C. The film is corona treated on one skin surface and flame treated on a second skin surface. The film has baggy lanes and is not uniform in appearance. The film in combination with the curable adhesive of this invention is used to label a container in a heat shrink label process, as described hereinbelow, where the labeled container has a good appearance due to the high conformability of the film and adhesive seam to the container.

[a] Core layer is 80% of film thickness and contains on wt. basis 29.7% polypropylene copolymer Huntsman P5M4K-070X, 39.6% syndiotactic polypropylene Atofina EOD96-30, 29.7% polyterpene Exxon Exxelor PA609A, and 1% polyisobutylene Colortech 10359-41.
[b] Each skin layer is 10% of the film thickness and contains on wt. basis 60.6% polypropylene copolymer Huntsman P5M4K-070X, 7.4% ethylene-octene copolymer Dow Affinity KC8852, 30.5% polypropylene homopolymer 0.5% process aid concentrate Ampacet 401198.

Example 2

A 50.8 micrometer thick film is prepared according to Example 1 except that the film is machine direction oriented at a draw ratio of 6:1 and a draw temperature of 121° C. The film of Example 2 is uniformly good in appearance relative to the film of Example 1. The film of Example 2 in combination with the curable adhesive of this invention is used to label a container in a heat shrink label process as described hereinbelow. The appearance of the Example 2 labeled container is not as good as that of the Example 1 labeled container.

Curable Adhesive

The (meth)acrylate resin curable adhesive of this invention comprises (1) at least one urethane (meth)acrylate resin, (2) at least one tackifier, and (3) at least one photoinitiator where the adhesive has sufficient precure tack to effectively bond adherents before the adhesive is cured. The term "resin" means a composition comprising a monomer, an oligomer, a polymer, or a mixture thereof. The term "(meth)acrylate" means that a methacrylate group, an acrylate group, or a mixture of methacrylate and acrylate groups can be present. The term "(meth) acrylate resin" means that the resin can comprise a methacrylate-containing resin, an acrylate-containing resin, a methacrylate-containing and acrylate-containing resin, or a mixture of any of the foregoing resins. In several embodiments of the invention, the at least one urethane (meth)acrylate resin (1) and the at least one tackifier (2) are respectively present in the adhesive on a weight basis in a ratio of 1-10:1, 1.25-9:1 or 1.5-8:1. In one embodiment, the uncured adhesive is sufficiently fluid at the temperature of application to effectively wet out the surface of adherents, andh in another embodiment the uncured adhesive has a viscosity of 6,000 mPa-s or less at the temperature of application, wherein the temperature of application is 107° C. or less. In embodiments of the invention the curable adhesive comprising at least one urethane (meth)acrylate resin (1), at least one tackifier (2), and at least one photoinitiator (3) further comprises (4) at least one other curable resin, or (5) at least one additive, or a mixture of any of the foregoing components (4) and (5). The mixture of components can comprise two or more materials of the same component type such as, for example, two or more other curable resins, or the mixture can comprise one or more materials from each of the different component types such as, for example, one or more other curable resins and one or more additives. The curable adhesive is curable by a polymerization process comprising a free radical polymerization process. The free radical polymerization process comprises by electromagnetic radiation such as visible or ultraviolet. In several embodiments of the invention, the initiator comprises a photoinitiator, an ultraviolet photoinitiator, or a free radical ultraviolet photoinitiator. The curable adhesive of the present invention can also include curable components such as epoxides, oxethanes and lactams which are curable by processes such as a cationic polymerization process. The components of the curable adhesive of this invention as well as the starting materials and intermediates to these components are available from adhesive suppliers or can be formed by known methods of preparation as described hereinbelow.

Urethane (Meth)acrylate Resin

Component (1) of the adhesive comprises a urethane (meth)acrylate resin that can be formed by reacting a polyol-containing composition with an organic polyisocyanate in an equivalent ratio of about 0.9 to about 1.1 hydroxy groups: to about 2 or more isocyanate (—NCO) groups, to form a urethane-isocyanate intermediate. The formation of the urethane-isocyanate intermediate is followed by reaction of the intermediate with a hydroxyalkyl (meth)acrylate or with a hydroxyalkyl (meth)acrylate and an alcohol to form a urethane (meth)acrylate resin.

Alternatively, as described in U.S. Patent Publication No. US 2004/0010111, a hydroxyalkyl (meth)acrylate or a hydroxyalkyl (meth)acrylate and an alcohol can be reacted with an excess of an organic polyisocyanate in an equivalent ratio of about 0.9 to about 1.1 hydroxy groups: to about 2 or more isocyanate (—NCO) groups, to form a urethane-isocyanate intermediate. The formation of the urethane-isocyanate intermediate is followed by reaction of the intermediate with a polyol-containing composition in an equivalent ratio of about 0.9 to about 1.1 isocyanate groups: to about 0.9 to about 1.1 polyol hydroxy groups, to form a urethane (meth)acrylate resin. In several embodiments of the invention, the urethane (meth)acrylate resin can contain an average of less than 1, 1, more than 1, about 1 to about 1.6, about 1.05 to about 1.6, about 1.1 to about 1.5, about 1.2 to about −1.4, or greater than 1.6 methacrylate groups or acrylate groups or a combination of both groups.

The polyol-containing composition can contain 2 or more hydroxy groups, and can be monomeric or oligomeric or polymeric or a mixture thereof. The polyol-containing composition can comprise an aliphatic polyol having 2 or more carbon atoms, such as for example, ethylene glycol, glycerol, di(ethylene glycol) and di(propylene glycol)s, a polyether polyol having 2 or more ether groups and usually 6 or more carbon atoms to include poly(ethylene glycol)s and poly(propylene glycol)s, polyalkoxylated polyols, such as for example, tri(ethylene glycol) and tri(propylene glycol)s and a polyethoxylated glycol or polyethoxylated glycerol, a polyester polyol having 2 or more ester groups and prepared from one or more polycarboxylic acids and one or more polyhydric alcohols, or a mixture of any of the foregoing polyol-containing compositions. The polyol-containing composition can have a molecular weight of at least 60; about 60 to about 10,000; about 300 to about 8,000; about 500 to about 7,000; about 700 to about 6,000; about 300 to about 6,000; or about 500 to about 3,000.

In an embodiment of the invention, the polyol-containing composition comprises a polyether polyol, a polyester polyol, or a mixture of any of the foregoing polyols. In several embodiments, the polyol-containing composition is a polyester or polyether diol having a molecular weight of at least 150; about 150 to about 10,000; about 300 to about 6,000; about 1,000 to about 5,000; or about 500 to about 3,000.

The organic polyisocyanate has 2 or more isocyanate groups, and can comprise an aliphatic polyisocyanate, an aromatic polyisocyanate, or a mixture of any of the foregoing polyisocyanates. Aliphatic polyisocyanates comprise polyisocyanates in which all the isocyanate groups are attached to an aliphatic moiety. Useful aliphatic polyisocyanates comprise, for example, trans-1,4-cyclohexanediisocyanate, 1,6-diisocyanatohexane, isophorone diisocyanate, 1,3-bis(isocyanatomethyl)cyclohexane and 1,3-bis(1-isocyanato11-methylethyl)benzene. Aromatic polyisocyanates comprise polyisocyanates in which 1 or more of the isocyanate groups are attached directly to an aromatic ring. Useful aromatic polyisocyanates comprise, for example, 1,4-phenylene diisocyanate and tolylene-2,4-diisocyanate. In one embodiment, the organic polyisocyanate is an aliphatic diisocyanate.

The polyol-containing composition and organic polyisocyanate can be reacted in an equivalent ratio of about 1, or about 0.9 to about 1.1 hydroxy groups: to about 1 to about 2, or about 1.8 to about 2.2, or 1.8 to greater than 2 isocyanate groups; wherein a 1:1 ratio favors formation of a polyurethane and a 1:2 or greater than 2 ratio favors formation of monomeric and oligomeric species. In one embodiment, a polyether diol is reacted with an aliphatic diisocyanate in an equivalent ratio of about 1 hydroxy group: to about 1.8 to about 2.2 isocyanate groups. The urethane-isocyanate intermediate, formed from the reaction of the polyol-containing composition and organic polyisocyanate, can be reacted with a hydroxyalkyl (meth)acrylate. The hydroxyalkyl (meth)acrylate can comprise a hydroxyalkyl methacrylate, a hydroxyalkyl acrylate, or a mixture of any of the foregoing hydroxyalkyl esters. The hydroxyalkyl group of the hydroxyalkyl (meth)acrylate can contain 2 or more carbon atoms, or about 2 to about 20 carbon atoms, or about 2 to about 10 carbon atoms.

Useful hydroxyalkyl (meth)acrylates comprise, for example, hydroxyethyl acrylate and hydroxyethyl methacrylate. The urethane-isocyanate intermediate can be reacted with the hydroxyalkyl (meth)acrylate to give a urethane (meth)acrylate resin having an average or about 0.1 or more (meth)acrylate groups per resin molecule. The urethane-isocyanate intermediate and hydroxyalkyl (meth)acrylate can be reacted on an equivalent basis in a ratio of less than 1 to greater than 1 isocyanate group:1 OH group. In several embodiments, the hydroxyalkyl (meth)acrylate is reacted with the urethane-isocyanate intermediate to yield a urethane epoxy (meth)acrylate resin having an average of about 1 to about 1.6, or about 1.05 to about 1.6, or about 1.1 to about 1.5, or about 1.2 to about 1.4 (meth)acrylate groups on the urethane (meth)acrylate resin molecule. In a further embodiment, the urethane-isocyanate intermediate is reacted with a hydroxyalkyl acrylate in an equivalent ratio that gives a urethane acrylate resin having an average of about 1 to about 1.6, or about 1.05 to about 1.6 acrylate groups per resin molecule. In another embodiment, a urethane-isocyanate intermediate, formed from reaction of about 1.8 to about 2.2 moles of an aliphatic diisocyanate with 1 mole of a polyether diol, is reacted with a hydroxyalkyl acrylate in an equivalent ratio that gives a urethane acrylate resin having an average of about 1 to about 1.6, or about 1.05 to about 1.6, or about 1.3 acrylate groups per resin molecule. In one embodiment, a polyether diol is reacted with an aliphatic diisocyanate in an equivalent ratio of about 1 hydroxy group: to about 1.8 to about 2.2 isocyanate groups to form a urethane-isocyanate intermediate. The intermediate is then reacted with a hydroxyalkyl acrylate to give a urethane acrylate resin having about 1 to about 1.6, or about 1.05 to about 1.6 acrylate groups per resin molecule. The urethane acrylate resin is reacted with an alcohol to convert the remaining unreacted isocyanate groups to alkyl urethane or alkyl carbamate groups. The alcohol can comprise one or more monohydric aliphatic alcohols having 1 or more carbon atoms, or about 1 to about 20 carbon atoms, or about 1 to about 12 carbon atoms. The urethane (meth)acrylate resin can have a number average molecular weight of at least 500, or about 500 to about 30,000, or about 750 to about 25,000, or about 1,000 to about 20,000, or about 1,500 to about 16,000.

The urethane (meth)acrylate resin can have a Brookfield viscosity at ambient temperature near 25° C. of at least 17,000, or at least 20,000, or at least 23,000 cP (centipoise) or mPa-s (millipascal-second) (1 cP=1 mPa-s). The urethane (meth)acrylate resin can have a Brookfield viscosity at ambient temperature near 25° C. of 15,000-250,000; 20,000-200,000; 24,000-150,000 cP or mPa-s.

Useful urethane (meth)acrylate resins include the aliphatic urethane acrylate oligomer CN3211 which has a viscosity at 25° C. of 27,500 cP or mPa-s and is available from Sartomer Company, Inc., and GENOMER™ 4188 which is available from Rahn Corp. and consists of 80 wt. % of a monoacrylate-functional polyester based urethane having a weight average molecular wt. of 8,000 and 20 wt. % of 2-ethylhexyl acrylate. Other useful urethane (meth)acrylate resins include those available from Bomar Specialties Company such as BR-3071, a high molecular weight (greater than 4,000 g/mole) aromatic, polyether-based urethane acrylate having an acrylate functionality of 1 and a viscosity of 92,000 cP or mPa-s at 25° C.; BR-3641AA, a high molecular wt. aliphatic, polyether-based urethane acrylate having an acrylate functionality of 1.3 and a viscosity of 24,000 cP or mPa-s at 50° C.; and BR-3741AB, a high molecular wt. aliphatic, polyether-based urethane acrylate having an acrylate functionality of 1.3 and a viscosity of 55,000 cP or mPa-s at 50° C. The urethane (meth)acrylate resin is present in the inventive adhesive on a weight basis ranging from about 10% to about 90%, or about 20% to about 90%, or about 25% to about 87%, or about 30% to about 84%.

Tackifier

Component (2) of the adhesive comprises a tackifier. The tackifier comprises a resin having a relatively low molecular weight and relatively high $T_g$ (glass transition temperature) that can serve as a solvent for the curable (meth)acrylate resins to enhance wet out, peel and adhesion properties of the adhesive. The tackifier resin can comprise monomers, oligomers, polymers, and mixtures thereof. The tackifier can comprise a nonreactive resin, a reactive resin, or a mixture thereof. The tackifier can comprise a natural rosin comprising unsaturated high molecular weight rosin carboxylic acids, a modified natural rosin comprising hydrogenated high molecular weight rosin carboxylic acids, a polyester comprising rosin esters such as glycerol and pentaerythritol esters of natural and modified natural rosins, aliphatic hydrocarbon resins derived from petroleum or plants, aromatic hydrocarbon resins derived from petroleum or plants, urea-aldehyde condensate resins, and mixtures of two or more of the foregoing materials. The aliphatic hydrocarbon resins comprise unsaturated resins, saturated resins via hydrogenation, and mixtures thereof. The aliphatic hydrocarbon resins comprise resins prepared by the polymerization or copolymerization of aliphatic olefins which comprise monoolefins and/or polyolefins to include $C_5$ based olefins such as pentadienes, methyl-substituted butenes, butadienes such as isoprene, cyclopentenes, pentenes, dicyclopentadienes, terpenes such as the pinenes, cyclopentadienes, and mixtures thereof. Aliphatic hydrocarbon resins include terpene based resins comprising terpene homopolymers, terpene copolymers, phenol modified terpene resins, and mixtures thereof. The aromatic hydrocarbon resins comprise resins prepared by polymerization or copolymerization of aromatic monomers to include $C_9$ based aromatic monomers comprising styrene based monomers such as styrene and vinyltoluenes and alpha-methylstyrenes, indenes, and mixtures thereof. The aromatic hydrocarbon resins include resins prepared by copolymerization of aromatic monomers with olefins such as $C_5$ based olefins, indene-cumarone resins, and mixtures thereof. The urea-aldehyde condensate resins comprise resins prepared by initially condensing urea or a urea derivative with an aldehyde having an acidic hydrogen on the carbon atom adjacent to the —CHO aldehyde group to form oxohexahydropyrimidine based intermediates which are further reacted with formaldehyde and the acidic-hydrogen-containing aldehyde as described in U.S. Pat. No. 4,906,727. The urea derivatives include thioureas and alkylene coupled ureas and thioureas such as for example methylenediurea.

Useful tackifiers comprise the aliphatic $C_5$ petroleum hydrocarbon resin Wingtack® 95 Flake, which is available from Sartomer Company, Inc. and has a number average molecular wt. of 1,100 g/mole, an onset $T_g$ of 49° C. and an FTIR olefinic ratio of 0.23; the rosin ester SYLVALITE® RE 80HP, which is available from Arizona Chemical and has a Brookfield viscosity at 125° C. of 1,270 cP or mPa-s; the low molecular weight polystyrene resin Piccolastic® A75 from Eastman; and the urea-aldehyde condensate resin Laropal® A81 from BASF. The tackifier is present in the adhesive on a weight basis from about 5% to about 60%, or about 8% to about 50%, or about 5% to about 40%, or about 10% to about 40%.

Photoinitiator

Component (3) of the adhesive comprises a photoinitiator. The curable adhesive in an embodiment of the invention can be cured by free radical polymerization of unsaturates by exposing the adhesive to electromagnetic radiation. The photoinitiator serves to catalyze or promote a polymerization reaction of the polymerizable adhesive components to effect curing of the adhesive. The photoinitiator comprises a free radical photoinitiator, a cationic photoinitiator, or a combination of any of the foregoing photoinitiators. Photoinitiators are generally activated by exposure to electromagnetic radiation to include infrared, visible, ultraviolet (or UV), and combinations thereof. In several embodiments, the initiator is a UV-activated photoinitiator, a UV-activated free radical photoinitiator, or a combination of UV-activated free radical and cationic photoinitiators. Free radical photoinitiators can be activated by exposure to electromagnetic radiation including, for example, UV to form free radicals which initiate free radical polymerization of unsaturates such as (meth)acrylate-containing resins. Cationic photoinitiators can be activated by exposure to electromagnetic radiation including, for example, UV to form cations which initiate cationic catalyzed type polymerizations such as an epoxide polymerization. The UV-activated free radical photoinitiator can comprise at least one photoinitiator of the type that undergoes a unimolecular bond cleavage reaction to form free radicals including where the cleavage is alpha-cleavage or beta-cleavage, at least one photoiniator and one coinitiator of the type that undergoes a bimolecular bond cleavage reaction to form free radicals, or combinations thereof. Free radical photoinitiators of the unimolecular bond cleavage type can comprise benzoyl type photoinitiators including benzoin ethers and benzil ketals and alpha-dialkoxyacetophenones and alpha-hydroxyalkylphenones and alpha-halogeno-acetophenones, amino-ketones, acyl-phosphine oxides, or mixtures thereof.

Useful unimolecular type free radical photoinitiators include, for example, 2-hydroxy-2-methylpropiophenone and/or butyrophenone and the commercial UV-activated free radical photoinitiators SARCURE® SR1135 from Sartomer Company, Inc. which is a three-photoinitiator-blend of 2,4,6-trimethyl benzoyl diphenyl phosphine oxide and oligo [2-hydroxy-2-methyl-1-[4-(1-methylvinyl)phenyl]propanone] and methylbenzophenone derivatives, Genocure® LTM from Rahn Corp, the 1-hydroxycyclohexyl phenyl ketone based photoinitiator Esacure® KS300 from Sartomer, the oligomeric photoinitiator oligo [2-hyd roxy-2-methyl-1-[4-(1-methylvinyl)phenyl]propanone] from Sartomer, the photoinitiators KIP 150 and KIP 100F and KL 200 from Lamberti, and the 4-phenylbenzophenone based photoinitiator Genocure® PBZ from Rahn. Free radical photoinitiators of the bimolecular bond cleavage type can comprise as the photoinitiator at least one of a benzophenone or a thioxanthone or a titanocene and as the coinitiator at least one of an alcohol or an ether or an amine having an abstractable alpha-hydrogen. Useful bimolecular type free radical photoinitiators and coinitiators include for example benzophenone and tetrahydrofuran. The UV-activated cationic photoinitiator can comprise a photoinitiator of the type comprising a sulfonium salt, an iodonium salt, or mixtures thereof including, for example, the SARCAT® CD 1010, 1011 and 1012 series of photoinitiators available from Sartomer. Selection of a UV-activated photoinitiator and the amount of the photoinitiator is generally based on the emission characteristics and intensity of the UV source and on the spectral sensitivity of the photoinitiator. The commercially available photoinitators can be used individually or in combinations depending on the requirements for an adhesive and service conditions. Generally, oligomeric photoinitiators are used in adhesive applications involving high temperatures and/or extended times at temperatures above ambient.

In several embodiments of the invention, the curable adhesive comprises a free radical photoinitiator, such as for example a UV-activated free radical photoinitiator, wherein the adhesive can be cured by being exposed for less than 5 minutes, or 3 minutes, or 1 minute to an electromagnetic radiation source, such as for example a UV source, having an intensity of at least 20, or 50, or 80, or 100 $mJ/cm^2$ (millijoules per square centimeter) where the (meth)acrylate resin double bonds of the adhesive are at least 60%, or 70%, or 80%, or 90% reacted or consumed. The initiator is optionally present in the inventive adhesive depending on the requirements of the intended area of use and when present can range on a weight basis from about 0.1 to about 15%, or about 0.2 to about 12.5%, or about 0.5 to about 10%, or about 1-8%.

Other Curable Resins

Component (4) of the adhesive comprises at least one other curable resin in addition to the urethane (meth)acrylate resins of component (1) described hereinabove. The at least one other curable resin of component (4) comprises other (meth) acrylate based resins, epoxy based resins, other curable resins containing one or more double bonds which are polymerizable by a free radical process, and mixtures of any of the foregoing resins. The other (meth)acrylate based resins comprise epoxy (meth)acrylate resins, alkoxylated monool (meth)acrylate resins, (meth)acrylate esters of polyols including polyols based on polyhydric alcohols and polyethers and polyesters, (meth)acrylate esters of monohydric alcohols such as ethyl acrylate and vinyl methacrylate, (meth) acrylic resins comprising (meth)acrylic oligomers or polymers containing a polymerizable (meth)acrylic group, olefin-(meth)acrylic copolymers comprising coplymers of (meth) acrylic acids and/or (meth)acrylate esters with olefins such as butadiene, (meth)acrylated hydrocarbon oils, (meth)acrylated silicone oils, and mixtures of any of the foregoing resins.

Epoxy (Meth)acrylate Resins

Epoxy (meth)acrylate resins comprise resins which can be formed by first reacting a polyol reagent with a epoxide-containing or epoxide-forming reagent to form an epoxide intermediate. The formation of the epoxide intermediate is followed by reaction of the epoxide intermediate with a hydroxy-containing (meth)acrylic reagent or with a hydroxy-containing (meth)acrylate reagent and a saturated hydroxy-containing nucleophile, an amine-containing nucleophile, or a mixture of any of the foregoing nucleophiles to form an epoxy (meth)acrylate resin, wherein the epoxy (meth)acrylate resin contains essentially no epoxy group and the amine-containing nucleophile has at least one N—H or nitrogen to hydrogen bond. In several embodiments of the invention, the epoxy (meth)acrylate resin contains essentially no epoxy groups per resin molecule, wherein there are on average 0.2 or less, or 0.1 or less, or 0.05 or less, or 0.025 or less, or 0.02 or less epoxy groups per resin molecule. In several embodiments, the epoxy (meth)acrylate resin can contain on average less than 1, or more than 1, or about 1 to about 1.6, or about 1.05 to about 1.6, or about 1 to about 1.5, or about 1.2 to about 1.4, or greater than 1.6 methacrylate groups or acrylate groups or a combination of both groups per resin molecule.

The polyol reagent can have 2 or more hydroxy groups. The polyol reagent can comprise a condensate of a hydroxy-containing aromatic compound and an aldehyde and/or ketone, an aliphatic polyol, or a mixture thereof. The hydroxy-containing aromatic compound can be phenol, a substituted phenol, such as for example, a cresol, a polyhydroxy aromatic compound, such as for example, a catechol, or a mixture thereof. The aldehyde can have one or more carbon atoms to include, for example, formaldehyde. The ketone can have three or more carbon atoms to include, for example, acetone. The hydroxy-containing aromatic compound and aldehyde and/or ketone are generally condensed respectively in a mole ratio of about 1-3:1, 0.5-2:1, 1-2:1, or 2:1 hydroxy: alhelyde/ketone. In one embodiment, the polyol reagent comprises a diol of a bisphenol-aldehyde or ketone condensate. Useful polyol reagents prepared from hydroxy-containing aromatic compounds include, for example, bisphenol A or 4,4'-isopropylidenediphenol, bisphenol F or bis(4-hydroxyphenyl)methane, and bisphenol E or 4,4'-ethylidenebisphenol. The polyol reagent can comprise aliphatic polyols having 2 or more carbon atoms to include, for example, ethylene glycol, butanediol, and hexanediol. The polyol reagent can also comprise alkoxylates of a reaction product of a hydroxy-containing aromatic compound and aldehyde and/or ketone, alkoxylates of an aliphatic polyol, or mixtures thereof. These alkoxylates can have one or more oxyalkylene units to include, for example, ethoxylates of bisphenol A and ethoxylates of neopentyl glycol.

The epoxide-containing or epoxide-forming reagent can comprise a halogen-containing aliphatic epoxide that can contain one or more epoxide rings and three or more carbon atoms to include, for example, epichlorohydrin and 4-chloro-1,2-epoxybutane.

The polyol reagent and epoxide reagent, wherein the epoxide reagent is the epoxide-containing or epoxide-forming reagent, can be reacted on an equivalent basis in a ratio of less than 1 to greater than 1 polyol OH:1 epoxide group. In an embodiment of the invention, the polyol reagent and epoxide reagent are reacted in a 1:1 equivalent ratio such as, for example, in the reaction of 1 mole of bisphenol A with 2 moles of epichlorohydrin to form as an epoxide intermediate the diglycidyl ether of bisphenol A, which on an equivalent basis is 1 hydroxy group:1 halogen group. The epoxide intermediate can also include reaction products in which the equivalent ratio of polyol reagent to epoxide-containing or epoxide-forming reagent such as a halogen-containing aliphatic epoxide is respectively greater than 1 hydroxy group:1 halogen group, so that the polyol reagent can further react with the epoxide group as described in U.S. Pat. No. 5,989,778. In one embodiment, the epoxide intermediate is a reaction product of a polyol reagent and a halogen-containing aliphatic epoxide reacted in respectively an equivalent ratio of 1 hydroxy group:1 halogen group where the polyol reagent is formed from the reaction of a phenol and a ketone in respectively a 2:1 mole ratio. In another embodiment, the epoxide intermediate is formed by reacting bisphenol A with epichlorohydrin in respectively a 1:2 mole ratio. A useful epoxide intermediate is EPON™ Resin 828, which is available from Resolution Performance Products and has an epoxide equivalent weight of 185-192 per ASTM D1652.

The hydroxy-containing (meth)acrylic reagent can comprise methacrylic acid, acrylic acid, a hydroxyalkyl methacrylate, a hydroxyalkyl acrylate, or a mixture of any of the foregoing hydroxy-containing (meth)acrylic reagents. The epoxide intermediate and hydroxy-containing (meth)acrylic reagent can be reacted on an equivalent basis in a ratio of less than 1 to greater than 1 epoxide group:1 OH group. The epoxide intermediate and hydroxy-containing (meth)acrylic reagent can be reacted in a ratio that results in on average 0.1 or more (meth)acrylate groups on the epoxy (meth)acrylate resin molecule. In several embodiments of the invention, the hydroxy-containing (meth)acrylic reagent is reacted with the epoxide intermediate to yield an epoxy (meth)acrylate resin having an average of about 1 to about 1.6, or about 1.05 to about 1.6, or about 1.1 to about 1.5 or about 1.2 to about 1.4 (meth)acrylate groups on the epoxy (meth)acrylate resin molecule. In another embodiment, the epoxide intermediate is reacted with methacrylic acid, acrylic acid, or a mixture thereof in an equivalent ratio where on average there are about 1 to about 1.6, or about 1.05 to about 1.6, or about 1.1 to about 1.5, or about 1.2 to about 1.4 (meth)acrylate groups on the resin molecule. In a further embodiment, the diglycidyl ether of bisphenol A is reacted with acrylic acid in an equivalent ratio to give an average of about 1 to about 1.6, or about 1.05 to about 1.6, or about 1.1 to about 1.5, or about 1.2 to about 1.4, or about 1.3 acrylate groups per resin molecule. In one embodiment of the invention, the epoxy (meth)acrylate resin is prepared by reacting a hydroxy-containing (meth)acrylic reagent and an epoxide intermediate to give a reaction product containing some unreacted epoxide groups, which is further reacted with a nucleophilic reagent to the epoxy (meth) acrylate resin containing essentially no epoxy group as described hereinabove. The nucleophilic reagent can comprise water, an alcohol, an amine, a carboxylic acid, or a mixture of any of the foregoing nucleophilic reagents. In one embodiment, the nucleophilic reagent can comprise an alcohol which can be monohydric or polyhydric or a mixture thereof, and can be aliphatic or aromatic or a mixture thereof. Useful alcohols comprise aliphatic monools having 1 or more carbon atoms such as for example methanol, aliphatic diols having 2 or more carbon atoms to include ether-containing and polyether-containing diols such as, for example, ethylene glycol and di(ethylene glycol) and poly(ethylene glycol)s, and mixtures thereof. In one embodiment, the reaction product of the epoxide intermediate and hydroxy-containing (meth)acrylic reagent contains some unreacted epoxy groups and is further reacted with an alcohol. In embodiments of the invention, the alcohol is an aliphatic diol. In a further embodiment, the reaction product of the diglycidyl ether of bisphenol A and acrylic acid, having an average of about 1 to about 1.6, or about 1.05 to about 1.6 acrylate groups per resin molecule, is reacted with a glycol in an equivalent ratio of 1 epoxide:1 OH to give essentially no epoxy group in the epoxy (meth) acrylate resin molecule. The epoxy (meth)acrylate resin can range in molecular weight from about 300 to about 10,000, or about 350 to about 7,000, or about 400 to about 4,000, or about 300 to about 3,000, or about 350 to about 2,000, or about 400 to about 1,500. In several embodiments of the invention, the epoxy (meth)acrylate resin can have a Brookfield viscosity at ambient temperature near 25° C. of 100-5,000, 200-4,000, 300-2,500, 100-700, 200-600, or 300-500 cP (centipoise) or mPa-s (millipascal-second). Useful epoxy (meth)acrylate resins include the acrylated epoxy resins EBECRYL™ 600, 629, 860 and 3780 and RXO™ 2034 available from UCB Radcure Inc. and PHOTOMER™ 3016, 3038 and 3071 available from Henkel Corp.

Alkoxylated Monool (Meth)acrylate Resin

Alkoxylated monool (meth)acrylate resins comprise resins which can be formed by reacting a monool with an alkylene oxide to form an alkoxylated monool, followed by reaction of the alkoxylated monool with a (meth)acrylate-esterifying reagent to form the alkoxylated monool (meth)acrylate resin.

The monool can be a hydrocarbon or hetero-atom-containing hydrocarbon having one hydroxy group. The monool can comprise an aliphatic monohydric alcohol having 1 or more carbon atoms such as, for example, 1-hexadecanol and 2-methoxyethanol, a nonaromatic cyclic or polycyclic monohydric alcohol having generally 4 or more carbon atoms such as, for example, cyclohexanol, a monohydroxy-containing aromatic compound generally containing 6 or more carbon atoms such as, for example, phenol and 4-nonylphenol, or a mixture of any one of the foregoing monools.

The alkylene oxide can be an epoxide having 2 or more carbon atoms such as, for example, ethylene oxide or propylene oxide or can be a mixture of 2 or more epoxides wherein the epoxides differ in the number of carbon atoms such as, for example, a mixture of ethylene oxide and propylene oxide.

In one embodiment of the invention, the monool is reacted with an akylene oxide to give a monoalkoxylated product having on average a monool to alkylene oxide mole ratio of 1:0.5-1.4. In another embodiment, the monool is reacted with an alkylene oxide to give a polyalkoxylated product having on average a monool to alkylene oxide mole ratio of 1:1.5 or greater. In several embodiments, the monool is reacted with the alkylene oxide in respectively a mole ratio of 1:0.1-20, or 1:1-15, or 1:1-10, or 1:2-10, or 1:1.5-50, or 1:1.5-25, or 1:1.5-15. In another embodiment, alkylphenol is reacted with an alkylene oxide in respectively a mole ratio of 1:1.5-6 or 1:2-6 where the alkyl group of the alkylphenol has 1-20, or 3-18 or 4-14 carbon atoms.

The (meth)acrylate-esterifying reagent can comprise methacrylic acid, acrylic acid, an alkyl methacrylate, an alkyl acrylate, or a mixture thereof, wherein the alkyl group of the alkyl methacrylate or acrylate generally can have 1-10 carbon atoms.

The alkoxylated monool and (meth)acrylate-esterifying reagent can be reacted respectively in a mole ratio of 1:0.1 to greater than 1 to esterify the alkoxylated monool and form the alkoxylated monool (meth)acrylate resin. In embodiments of the invention, a nonylphenol is reacted ethylene oxide to form an ethoxylated nonylphenol containing on average 2-6 oxyethylene units, and the ethoxylated nonylphenol is then esterified with an acrylate-esterifying reagent to give equal to or greater than 80%, or 85%, or 90% of an ethoxylated nonylphenol acrylate resin. The alkoxylated monool (meth)acrylate resin can have a molecular weight of 190-1500, or 200-1250, or 300-1000. In several embodiments of the invention, the alkoxylated monool (meth)acrylate resin can have a Brookfield viscosity at ambient temperature near 25° C. of 40-400, 60-300, or 80-200 cP or mPa-s. Useful alkoxylated monool (meth)acrylate resins are the ethoxylated nonylphenol acrylate SR-504 which is available from Sartomer Company, Inc. and has an acrylate functionality of 1, a molecular weight of 450 corresponding to an average of 4 ethoxy units, and a viscosity at 25° C. of 100 cP or mPa-s and the polypropoxylated nonylphenol acrylate NK-Ester NPA-5P which is available from Kowa American Corp.

The other curable resin component (4) is optionally present in the adhesive depending on the requirements of the intended area of use and service conditions. Useful other curable resins include the low viscosity mixture of (meth)acrylate resins CN3100 available from the Sartomer Company. The at least one other curable resin component (4) can be present in the inventive adhesive based on weight from about 0.5% to about 85%, or about 1% to about 70% or about 1.5% to about 60%.

Additive(s)

Component (5) of the adhesive comprises at least one or more additives. The (meth)acrylate resin curable adhesive of the present invention can comprise one or more additives depending on the intended area of use and service conditions. Component (5) can comprise diluents, surfactants comprising materials that function to defoam, wet, emulsify, disperse, level, or any combination of the foregoing functions, antioxidants, surface lubricants, polymerization inhibitors to include quinone based free radical scavengers such as for example MEHQ (hydroquinone methyl ether), antistatic agents, fillers, rheology control agents including materials known as thickeners, coloring agents to include pigments and dyes, plasticizers, chain transfer agents, materials containing an amino group to improve free radical reactivity and cure response, photosensitizers to extend spectral response to higher wavelengths to improve speed and depth of cure, and mixtures of any of the foregoing additives. The diluent can comprise a nonreactive or noncurable diluent to include for example a polyolefinic petroleum derived oil, a reactive or curable diluent to include vinyl-containing and (meth)acrylate-containing monofunctional and polyfunctional diluents such as, for example, isooctyl acrylate and 1,4-butanediol diacrylate, or a mixture of any of the foregoing diluents. The antioxidant can comprise a hindered phenol such as, for example, the cinnamate ester hindered phenol Irganox 1076 available from Ciba Specialty Chemicals, an organometallic compound, an aromatic amine, a phosphite, an organic sulfide, or a mixture of any of the foregoing antioxidants. Component (5) is optionally present in the inventive adhesive depending on intended use and service conditions. Each of the component (5) additives can be present in the inventive adhesive on a weight basis up to 85% or from about 0.005% to about 85%, or about 0.005% to about 50%, or about 0.01% to about 15%.

Precured Adhesive

The (meth)acrylate resin curable adhesive of the invention can be prepared by admixing, usually with a stirring or mixing device, the components in generally any order of addition at ambient temperature near 15° C. or at an elevated temperature up to generally 40° C., or 80° C., or 90° C. or 110° C. until the admixed components are homogeneous.

The curable adhesive of this invention prior to curing can have a viscosity at the temperature of application of about 100 to about 70,000, or about 100 to about 65,000, or about 600 to about 45,000, or about 600 to about 10,000, or about 600 to about 8,000, or about 1,000 to about 7,000, or about 1,000 to about 6,000, or about 1,000 to about 5,000, or about 1,000 to about 4,000, or about 1,000 to about 3,000 cP or mpa-s. The inventive curable adhesive prior to curing can have a viscosity in cP or mPa-s at the temperature of application of 6,000 or less, or 4,000 or less, or 3,000 or less. The temperature of application can range from ambient to an elevated temperature including from 15°-107°, 15°-80°, 20°-80°, 25°-107°, 25°-93°, 25°-82°, 25°-71°, or 25-66° C. The temperature of application can be 107° C. or less, or 93° C. or less, or 82° C. or less, or 71° C. or less, or 66° C. or less. The curable adhesive has a sufficient precure tack to effectively bond adherents before the adhesive is cured. In one embodiment of the invention, the adhesive has sufficient precure tack to effectively bond a plastic label and plastic container before the adhesive is cured in a high speed bottling process. The precure tack is considered to be sufficient when the adherents remain attached or bonded to each other during processing prior to curing of the adhesive such as, for example, when the adhesive prior to curing holds together a thermoplastic based label and a plastic or glass bottle without flagging in a high speed labeling operation. Flagging is an industry term indicating that the label has come at least partially loose from the bottle and generally results in a defectively labeled container.

In several embodiments of the invention, the uncured adhesive has a precure tack as measured by a minimal pressure adhesive loop tack test procedure[a] of 3.3-26, or 4.3-20, or 7.1-17 g/cm$^2$. The uncured inventive adhesive can have a loop tack of at least 4.3, at least 5.7, at least 7.1, or at least 10.6 g/cm$^2$.

[a]Minimal Pressure Adhesive Loop Tack Test

I. PURPOSE

To measure the tack of a coated adhesive with minimal pressure.

II. EQUIPMENT

Machine with reversing capability and a vertical jaw separation rate of 12 inch per minute. Stainless steel test panel, 1" width, made of 304 Bright Annealed Stainless Steel III. PROCEDURE
1. Bend the specimen back onto itself, being careful not to crease it, forming a teardrop shaped loop with the adhesive surface towards the outside.
2. Fasten the ends together using a strip of 1" wide tape, (If needed).
3. Insert the specimen into the upper grip so that the tape is completely within the jaws and exposed adhesive surface will contact the test surface perfectly flat.
4. Start the machine, bringing the specimen in contact with the test panel and immediately reversing direction.
5. The force gauge will record the maximum force required to break the bond between the specimen and the test panel. The force required to break the bond between the specimen and test panel shall be reported in force per square inch.

Cured Adhesive

The uncured (meth)acrylate resin adhesive of the invention can be cured by initiating polymerization of the polymerizable resin or resins present in the adhesive. In an embodiment of the invention, the uncured adhesive is cured by initiating a free radical polymerization of the (meth)acrylate resin or resins present in the adhesive by any suitable initiation method to include the initiation methods described hereinabove. In one embodiment, the uncured adhesive comprising a UV-activated free radical photoinitiator is cured by exposure to a UV source as described hereinabove.

In several embodiments of the invention the cured adhesive has an average peel adhesion as measured by test procedure ASTM D1876 of 70-1,400, or 80-1,000, or 90-850 gf (grams force).

ADHESIVE EXAMPLES

The following nonlimiting examples further describe and illustrate the (meth)acrylate resin curable adhesive of this invention.

Example 1

A UV curable adhesive is prepared by blending on a wt. basis 30 parts of a urethane acrylate resin BR-3641M from Bomar Specialties, 30 parts of an aromatic hydrocarbon resin tackifier Piccolastic® A75 from Eastman, and 36 parts of another curable resin CN3100 from Sartomer near 90° C. until the tackifier is dissolved. During the cool down phase of the preparation, 4 parts by wt. of a UV photoinitiator 1-hydroxycyclohexyl phenyl ketone Esacure® KS300 from Sartomer is added to the blend and dissolved to complete the preparation of the adhesive, which prior to curing has a viscosity of 1,900 mPa-s at 66° C. and a minimal pressure adhesive loop tack of 4.3 g/cm$^2$. After curing the adhesive has an ASTM D1876 average peel adhesion of 138 gf.

Example 2

A UV curable adhesive is prepared by blending on a wt. basis 12 parts of a urethane acrylate resin BR-3741AB from Bomar Specialties, 25.5 parts of a urethane acrylate resin BR-3641M from Bomar Specialties, 25.5 parts of a urea-aldehyde condensate resin tackifier Laropal® A81 from BASF, 30.6 parts of another curable resin CN3100 from Sartomer, and 2.4 parts of another curable resin SR-504 from Sartomer near 90° C. until the tackifier is dissolved. After cooling the blend to 55° C., 4 parts by wt. of a UV photoinitiator 1-hydroxycyclohexyl phenyl ketone Esacure® KS300 is added to the blend and dissolved to complete the preparation of the adhesive which is not homogeneous. Prior to curing the adhesive has a viscosity of 3,600 mPa-s at 66° C. and a minimal pressure adhesive loop tack of 7.1 g/cm². After curing, the adhesive has an ASTM D18763330 average peel adhesion of 711 gf.

Example 3

A UV curable adhesive is prepared by blending on a wt. basis 20 parts of a urethane acrylate resin BR-3741AB from Bomar Specialties, 22.5 parts of a urethane acrylate resin BR-3641M from Bomar Specialties, 22.5 parts of a urea-aldehyde condensate resin tackifier Laropal® A81 from BASF, 27 parts of another curable resin CN3100 from Sartomer, and 4 parts of another curable resin SR-504 from Sartomer near 90° C. until the tackifier is dissolved. After cooling the blend to 55° C., 4 parts by wt. of a UV photoinitiator 1-hydroxycyclohexyl phenyl ketone Esacure® KS300 is added to the blend and dissolved to complete the preparation of the adhesive which is not homogeneous. Prior to curing the adhesive has a viscosity of 2,800 mPa-s at 72° C. and a minimal pressure adhesive loop tack of 10.6 g/cm². After curing, the adhesive has an ASTM D1876 average peel adhesion of 496 gf.

Example 4

A UV Curable adhesive is prepared by blending on a wt. basis 45 parts of a urethane acrylate resin BR-3641AA from Bomar Specialties, 36 parts of a urethane acrylate resin BR-3741AB from Bomar Specialties, and 15 parts of an aromatic hydrocarbon resin tackifier Piccolastic® A75 from Eastman near 90° C. until the tackifier is dissolved. During the cool down phase of the preparation, 4 parts by wt. of a UV photoinitiator 1-hydroxycyclohexyl phenyl ketone Esacure® KS300 from Sartomer is added to the blend and dissolved to complete the preparation of the adhesive. Prior to curing, the adhesive has a viscosity of 4,000 mPa-s at 92° C. and a minimal pressure adhesive loop tack of 13 g/cm². After curing, the adhesive has an ASTM D1876 average peel adhesion of 107 gf.

Heat Shrink Label Process

The heat shrinkable label of the present invention can be used to encapsulate numerous articles for protection and/or identification to include, for example, the labeling of plastic beverage containers in a high speed labeling process. In an embodiment of the invention, a roll of the heat shrinkable film is fed onto a wrap-around labeler system where it is cut into individual pieces of film, the (meth)acrylate resin curable adhesive is applied to a leading and trailing edge of the cut film, the adhesive-containing film is wrapped around the article forming an adhesive seam, the adhesive seam is cured in a UV curing station, and the labeled article is passed through a heat chamber or tunnel to shrink the label in a high degree of conformability to the article. This process is fully disclosed in U.S. Pat. No. 6,808,822. In another embodiment of the invention, the process comprises curing the curable adhesive on the leading edge of the cut film with an energy source such as, for example, a UV lamp just as the film is initially wrapped around the article, followed by curing of the trailing edge after the adhesive seam is formed. In a further embodiment of the invention, the process comprises applying a hot melt adhesive to the leading edge and the curable adhesive to the trailing edge of the cut film, wrapping the adhesive-containing film around the article to form the adhesive seam, and curing the adhesive seam in a UV curing station.

Each of the documents referred to in this application is incorporated herein by reference. All numerical quantities in this application used to describe or claim the invention are understood to be modified by the word "about" except where explicitly indicated otherwise. All component quantities throughout the application are understood to be as undiluted actives unless indicated otherwise even though diluents may normally be present. Range and ratio limits used to define the invention throughout this application are understood to be combinable. Combinations of components to form the film and the adhesive of this invention are understood to total to 100% unless indicated otherwise.

While the invention has been explained in relation to specific embodiments, various modifications thereof will become apparent to those skilled in the art upon reading this application. It is understood that these various modifications, which fall within the scope of this detailed description and the appended claims, form a part of this invention.

What is claimed is:

1. A heat shrinkable label, comprising:
   (A) a heat shrinkable film, comprising at least one thermoplastic polymer; and
   (B) a curable adhesive, comprising:
      (1) at least one urethane (meth)acrylate resin having an average of about 1 to about 1.6 (meth)acrylate groups per resin molecule;
      (2) at least one tackifier wherein the tackifier comprises a urea-aldehyde condensate resin; and
      (3) at least one photoinitiator;
   wherein the film has an ultimate shrinkage at 135° C. of at least 15%, and the adhesive has sufficient precure tack, wherein the loop tack of the uncured adhesive is at least 4.3 g/cm².

2. The label of claim 1 wherein the film is a multilayer film comprising a core layer and at least one skin layer.

3. The label of claim 1 wherein the film is oriented uniaxially.

4. The label of claim 1 wherein the film is oriented biaxially.

5. The label of claim 1 wherein the photoinitiator comprises a free radical photoinitiator.

6. The label of claim 1 wherein the urethane (meth)acrylate resin is prepared from a polyol and an organic polyisocyanate.

7. The label of claim 6 wherein the polyol comprises a polyether polyol, a polyester polyol, or a mixture of any of the foregoing polyols.

8. The label of claim 1 wherein the curable adhesive has a viscosity prior to curing of 6,000 cP or less at an application temperature of 107° C. or less.

9. The label of claim 1 wherein the adhesive is applied to a trailing edge of the label.

10. A heat shrinkable label, comprising:
    (A) a heat shrinkable film, comprising:
       (1) a core layer having an upper and lower surface and comprising a blend of (a) at least one low molecular weight resin or rosin having a number average molecular weight below 5,000 and a softening point of 10-180° C. and (b) at least one syndiotactic polypropylene or cyclic olefin copolymer;
       (2) a first skin layer overlying the upper surface of the core layer; and
       (3) a second skin layer underlying the lower surface of the core layer; and
    (B) a curable adhesive, comprising:
       (1) at least one urethane (meth)acrylate resin having an average of about 1 to about 1.6 (meth)acrylate groups per resin molecule;

(2) at least one tackifier wherein the tackifier comprises a urea-aldehyde condensate resin; and (3) at least one photoinitiator;

wherein the film is oriented and has an ultimate shrinkage at 135° C. of at least 25%, and the adhesive has sufficient precure tack, wherein the loop tack of the uncured adhesive is at least 4.3 g/cm$^2$.

11. The label of claim 10 wherein the film is uniaxially oriented in the machine direction.

12. The label of claim 10 wherein said low molecular weight resin or rosin of component (A)(1)(a) comprises at least one polyterpene.

13. The label of claim 10 wherein the composition of the first skin layer is the same as the composition of the second skin layer.

14. The label of claim 10 wherein the core layer further comprises at least one polypropylene homopolymer, at least one polypropylene copolymer, or a mixture of any of the foregoing polymers.

15. The label of claim 14 wherein the polypropylene homopolymer and polypropylene copolymer are nucleated.

16. The label of claim 10 wherein the film is oriented in the machine direction at a draw ratio of 4.6-5.4:1 and a draw temperature of 108-118° C.

17. The label of claim 10 wherein the film is oriented in the machine direction at a draw ratio of 5.5-6.5:1 and a draw temperature of 116-126° C.

18. The label of claim 10 wherein the urethane (meth) acrylate resin is prepared from a polyol and an organic polyisocyanate.

19. The label of claim 18 wherein the polyol comprises a polyether polyol, a polyester polyol, or a mixture of any of the foregoing polyols.

20. The label of claim 18 wherein the polyol comprises a diol and the polyisocyanate comprises a diisocyanate.

21. The label of claim 10 wherein the photoinitiator comprises a free radical photoinitiator.

22. The label of claim 10 wherein the curable adhesive has a viscosity prior to curing of 6,000 cP or less at an application temperature of 107° C. or less.

23. The label of claim 10 wherein the adhesive is applied to a trailing edge of the label.

* * * * *